US009553418B2

(12) United States Patent
Della-Pergola et al.

(10) Patent No.: US 9,553,418 B2
(45) Date of Patent: Jan. 24, 2017

(54) SPATIALLY DISTRIBUTED LASER RESONATOR (71) Applicant: WI-CHARGE LTD., Rehovot (IL)

(72) Inventors: Refael Della-Pergola, Jerusalem (IL); Ortal Alpert, Nes Ziona (IL); Omer Nahmias, Aminadav (IL); Victor Vaisleib, Ramat Hasharon (IL)

(73) Assignee: Wi-Charge Ltd., Rehovot (IL)

( * ) Notice: Subject to any disclaimer, the term of this patent is extended or adjusted under 35 U.S.C. 154(b) by 0 days.

(21) Appl. No.: 14/961,156

(22) Filed: Dec. 7, 2015

(65) Prior Publication Data

US 2016/0087391 A1    Mar. 24, 2016

Related U.S. Application Data (63) Continuation of application No. 14/125,984, filed as application No. PCT/IL2012/000230 on Jun. 13, 2012, now Pat. No. 9,225,140.

(Continued)

(51) Int. Cl.
*H01S 3/08*    (2006.01)
*H01S 3/06*    (2006.01)
(Continued)

(52) U.S. Cl.
CPC ............ *H01S 3/0627* (2013.01); *H01S 3/005* (2013.01); *H01S 3/0014* (2013.01);
(Continued)

(58) Field of Classification Search
CPC ........ H01S 3/08; H01S 3/0805; H01S 3/0815; H01S 3/0816; H01S 3/0014; H01S 3/0604; H04B 10/807
See application file for complete search history.

(56) References Cited

U.S. PATENT DOCUMENTS 3,828,264 A    8/1974    Friedl et al.
4,209,689 A *  6/1980    Linford .............. H04B 10/2587
                                                     359/641

(Continued)

FOREIGN PATENT DOCUMENTS

JP    S48-078895 A    10/1973
WO    99/56359 A1     11/1999

(Continued)

OTHER PUBLICATIONS

PCT International Search Report and Written Opinion of the ISA, mailed Oct. 11, 2012 in PCT/IL2012/000230, 11 pages.

(Continued)

*Primary Examiner* — Yuanda Zhang
*Assistant Examiner* — Michael Carter
(74) *Attorney, Agent, or Firm* — Maine Cernota & Rardin (57) ABSTRACT A distributed resonator laser system using retro-reflecting elements, in which spatially separated retroreflecting elements define respectively a power transmitting and a power receiving unit. The retroreflectors have no point of inversion, so that an incident beam is reflected back along a path essentially coincident with that of the incident beam. This enables the distributed laser to operate with the beams in a co-linear mode, instead of the ring mode described in the prior art. This feature allows the simple inclusion of elements having optical power within the distributed cavity, enabling such functions as focusing/defocusing, increasing the field of view of the system, and changing the Rayleigh length of the beam. The optical system can advantageously be constructed as a pupil imaging system, with the advantage that optical components, such as the gain medium or a photo-voltaic converter, can be positioned at such a pupil without physical limitations.

8 Claims, 6 Drawing Sheets

Related U.S. Application Data (60) Provisional application No. 61/457,822, filed on Jun. 13, 2011.

(51) Int. Cl.
*H04B 10/80* (2013.01)
*H01S 3/16* (2006.01)
*H01S 3/00* (2006.01)
*H01S 3/081* (2006.01)

(52) U.S. Cl.
CPC .............. *H01S 3/0604* (2013.01); *H01S 3/08* (2013.01); *H01S 3/0805* (2013.01); *H01S 3/0813* (2013.01); *H01S 3/1611* (2013.01); *H01S 3/1643* (2013.01); *H04B 10/807* (2013.01); *H01S 3/0815* (2013.01); *H01S 3/08054* (2013.01)

(56) References Cited

U.S. PATENT DOCUMENTS

| | | | |
|---|---|---|---|
| 6,600,767 B1 | 7/2003 | Lefevre | |
| 6,624,916 B1 * | 9/2003 | Green | H04B 10/11 398/169 |
| 6,721,539 B1 | 4/2004 | O'Brien et al. | |
| 2002/0186742 A1 | 12/2002 | Flint et al. | |
| 2009/0103925 A1 | 4/2009 | Alpert | |

FOREIGN PATENT DOCUMENTS

| | | |
|---|---|---|
| WO | 2007036937 A2 | 4/2007 |
| WO | 2009083990 A2 | 7/2009 |

OTHER PUBLICATIONS

Linford, Gary, Very Long Lasers, Applied Optics, Feb. 1974, pp. 379-390, vol. 13, No. 2.

Extended European supplementary search report of the European Patent Office, in corresponding European patent application No. 12801385.1, dated Apr. 29, 2015.

Miao et al: "compact low threshold Cr:YAG passively Q-switched intracavity optical parametric oscillator", Optics Communications, North-Holland Publishing Co. Amsterdam, NL, vol. 281, No. 8. Dec. 31, 2007, pp. 2265-2270, XP022504305, ISSN: 0030-4018, DOI: 10-1016/J.OPTCOM.2007.12.012, * figure 1 *.

Linford et al., "Nd: YAG Long Lasers," Applied Optics, vol. 13, No. 6, pp. 1387-1394 (1974).

Office Action of the Japanese Patent Office, in corresponding Japanese patent application No. 2014-515337, dated Jun. 28, 2016, received on Jul. 26, 2016 with an English translation.

* cited by examiner

SPATIALLY DISTRIBUTED LASER RESONATOR

RELATED APPLICATIONS

This application is a continuation of U.S. application Ser. No. 14/125,984, filed Dec. 13, 2013 which is a national phase of PCT Application No. PCT/IL2012/000230, which was filed Jun. 13, 2012, which claims priority to U.S. Provisional Application 61/457,822, filed Jun. 13, 2011. Each of these applications is herein incorporated by reference in their entirety for all purposes.

FIELD OF THE INVENTION

The present invention relates to the field of distributed laser resonators using retroreflectors, especially for use in systems for wireless transmission of power to portable electronic devices by means of intracavity laser power.

BACKGROUND OF THE INVENTION

In the PCT application PCT/IL2006/001131, published as WO2007/036937 for "Directional Light Transmitter and Receiver" and in the PCT application PCT/IL2009/000010, published as WO/2009/008399 for "Wireless Laser Power" there are shown wireless power delivery systems based on distributed laser resonators. This term is used in the current disclosure to describe a laser having its cavity mirrors separated in free space, and without any specific predefined spatial relationship between the cavity mirrors, such that the laser is capable of operating between randomly positioned end reflectors. In the above mentioned applications, one use of such distributed laser resonators is in transmitting optical power from a centrally disposed transmitter to mobile receivers positioned remotely from the transmitter, with the end mirrors being positioned within the transmitter and receiver. Such distributed laser resonators use, as the end mirrors of the cavity, simple retro reflectors, such as corner cubes, and cats-eyes and arrays thereof. Retroreflectors differ from plane mirror reflectors in that they have a non-infinitesimal field of view. An electromagnetic wave front incident on a retroreflector within its field of view is reflected back along a direction parallel to but opposite in direction from the wave's source. The reflection takes place even if the angle of incidence of such a wave on the retroreflector has a value different from zero. This is unlike a plane mirror reflector, which reflects back along the incident path only if the mirror is exactly perpendicular to the wave front, having a zero angle of incidence.

Figure 1:
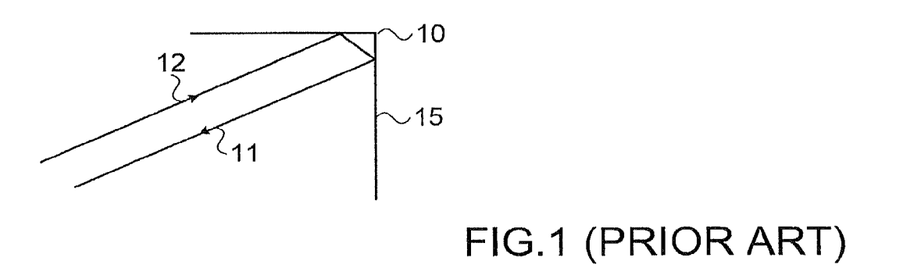
FIG. 1 shows a representation of a prior art corner cube retro reflector generating an optical image inversion around a point situated in the retroreflector, with the reflected beam traversing a spatially different path to that of the incident beam.

Many of such generally available retroreflectors, 15, such as that shown in FIG. 1, generate an optical image inversion around an inversion point 10 situated in the retroreflector (or around points in the case of an array of retroreflectors), or in close proximity thereto, with the reflected beam 11 traversing a spatially different path to that of the incident beam 12, as is shown in FIG. 1.

Figure 2:
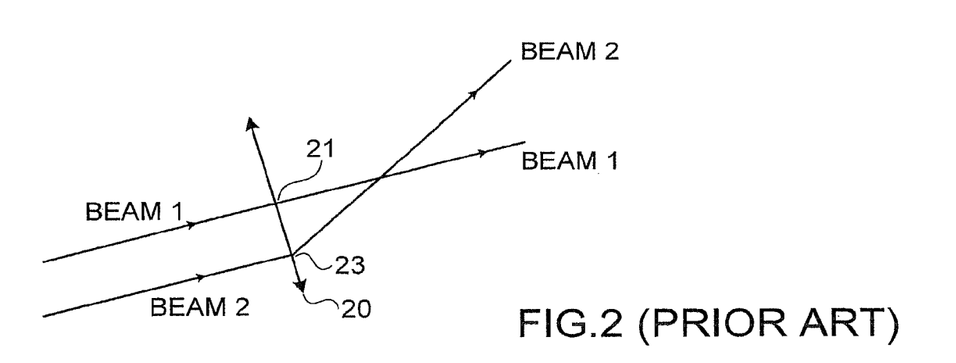
FIG. 2 shows schematically the result of placing a lens in the beam path of a retroreflector such as that shown in FIG. 1, having a point of optical inversion, resulting in spatially separated propagating beams.

This inversion around a point causes a number of problems in practical systems:

a. In many such simple retro reflectors, the inversion point is situated in an optically opaque location, where optical access cannot be provided, such as in a corner cube retroreflector.

b. As will be further expounded in paragraphs (c) to (f) below, a distributed laser system designed for practical use should require the placing of optical elements within the cavity. However, this may be problematic, since, following paragraph (a) above, the inversion point in an optically opaque location results in two beams which do not overlap. The explanation for this is that a retro reflector does inversion around the point of inversion 10 in the beam's direction. Thus, expressing the beam directions in in cylindrical coordinates, Theta, the orientation angle, remains constant, R becomes minus R and the direction is reversed. For the two beams to overlap R must equal minus R which dictates that R equals 0, meaning that the reflection must take place at the opaque inversion point. As a result of this lack of overlap, as shown in FIG. 1, placing a required optical element with at least one non-flat optical surface in the beam path will generally result in the two beams becoming unparallel, causing the distributed resonator to cease lasing. Such an optical component may cause each beam to be deflected differently, as is shown in FIG. 2, which illustrates the behavior of two parallel beams, one, marked Beam 1 passing through the optical center 21 of a lens 20, and one, marked Beam 2, passing through a point 23 displaced from the center. As is observed, after passage through the lens 20, the beams are no longer parallel. Since the two beams need to remain parallel for a distributed resonator to operate, as described in the aforementioned WO2007/036937 and WO/2009/008399, such an optical component cannot be used within a resonator having optical image inversion at its retroreflector(s) and having an opaque inversion point. Although it is possible to design certain optical elements to handle two parallel beams, such as a telescope lens arrangement, such a device may have a limited field of view and limited functionality, may require the separation between the beams to be fixed and may cause aberrations to both beams. This usually prevents the practical use of such telescope solutions. In U.S. Pat. No. 4,209,689 to G. J. Linford et al., for "Laser Secure Communications System", there is described a distributed laser cavity for long range communication, with a telescope in the cavity close to the gain medium. This system deals with a beam which is very axially defined, and operates with as limited a field of view as possible, involving angles of propagation close to the axis. No mention is made of the longitudinal position of elements such as the gain medium, down the cavity length. It is believed that the telescope is used to expand the beam and hence to limit the beam divergence and field of view. In many other cases, there may not be need for a telescope, but rather for another optical element having a different function, such as a focusing lens, with the same problems arising therefrom because of the double beams.

c. An optical system designed for two beams needs to use components generally having diameters of at least twice the size as those of equivalent single beam systems, in order to accommodate the two beams and the distance between them. This would increase the cost of the system, and its overall width.

d. Usually, two simple retroreflectors are not enough to achieve lasing, since the beam typically needs to be focused in order to compensate for Rayleigh expansion. In the above referenced WO/2009/008399, this problem was solved by using a thermal focusing element. However such a solution suffers from increased complexity due to the need to initiate it.

e. Optical elements having optical power, such as those having at least one non flat surface, may be necessary in the beam's path to achieve other optical functions, such as focusing, to correct aberrations, to monitor the system's state, to change the field of view of the system or to work with different apertures to allow for better performance/price of the system. Since the two beams are essentially separated, it may also be difficult to block ghost beams, as an increased aperture is needed.

f. Since placing imaging optics inside the resonator is difficult, it is difficult to form an image of the position of a receiver. Such information may be potentially necessary to monitor a receiver or receivers connected to the transmitter.

An additional problem arises with the distributed laser systems shown in the above two referenced PCT publications, since the direction and position of the beams within the system are not known. It then becomes difficult to know where to place direction sensitive components in the beam's path, such as polarizers, waveplates, frequency doubling crystals, and the like, it also becomes difficult to know how to use position limited components, such as small detectors, gain media, and the like, since it is not known where to position such components laterally.

There therefore exists a need for a distributed laser cavity architecture which overcomes at least some of the above mentioned disadvantages of prior art systems and methods.

The disclosures of each of the publications mentioned in this section and in other sections of the specification, are hereby incorporated by reference, each in its entirety.

SUMMARY OF THE INVENTION

The present disclosure describes new exemplary systems and methods, for achieving distributed cavity laser operation using retro-reflecting elements, in which the spatially separated retro-reflecting elements define a power transmitting unit and a power receiving unit. The gain medium is advantageously placed in the transmitter unit, so that one transmitter can operate with several receivers, the receivers being of simpler and lighter construction. The described systems and methods overcome the double beam problems associated with use of simple retroreflectors in such prior art lasing systems. The described systems and methods also overcome the problems of defining the position, both laterally and longitudinally, of various optical components within the laser cavity, which provide ancillary advantages to the lasing properties of the cavity. There is therefore an advantage to a system which allows for some or all of the following characteristics:

a) Allows for retro reflection along the incident beam's path, so that the incoming and returning beams travel along the same path. This feature enables the distributed laser to operate with the beams in a co-linear mode, instead of the ring mode described in the prior art.

b) Allows for elements with optical power, such as those with one or more non-flat optical surfaces to be placed in the outgoing/returning beam, wherein these components might perform, inter alia:
Focusing/defocusing
Increasing the field of view of the system
Changing the Rayleigh length of the beam
Adapting the beam to a specific operation distance.

c) Have regions in the system allowing placing of components so that light is always guaranteed to pass through the center of the component, so that component may be reduced in size and price, and increased in efficiency.

d) Have regions in the system allowing the placing of optical components such that light is always guaranteed to be parallel to an optical axis.

e) Have regions in the system where an image of the position of the receivers is formed, so that the receivers can be monitored.

f) Have regions in the system where it is known that the laser beam cannot reach, so that functional elements sensitive to the laser beam but not required for the lasing action itself, may be placed there.

In order to achieve at least some of the above mentioned requirements, and to thereby provide a distributed cavity laser capable of operating with the features necessary for practical use of such a laser in the general environment, and with the necessary safeguards, there is proposed in this disclosure a distributed laser having a number of novel characteristics, as explained forthwith:

Firstly, use is made of cavity end mirrors based on retro-reflectors capable of reflecting a beam back onto itself, such that the incoming and returning beams from each retro-reflector essentially travel along coincident, but counter propagating paths. Some examples of such retroreflectors include conventional cat's eye retroreflectors for beams entering the cat's eye through the central region of its entrance aperture, focusing/defocusing cat's eye retroreflectors (including two hemispheres such that one hemisphere focuses light on the surface of the other, or more complicated structures having multiple elements in them, and still focusing), multi element (generalized) cat's eye retroreflectors, hologram retroreflectors, phase conjugate mirrors, and reflecting ball mirrors which are capable of reflecting a beam onto itself. In the case of the reflecting ball mirrors, although the beam would become defocused as a result of the reflection, this may be solved by use of a focusing element elsewhere along the beam's path.

However, such retro-reflectors may generate aberrations and other beam propagation problems such as focusing or defocusing, excitation of higher-order beams, or other artifacts, which need to be treated in order to ensure consistent quality lasing at acceptable power conversion efficiencies and within accepted safety standards. In addition, use of such retroreflectors may limit the field of view, which therefore may need to be increased optically to make the system of practical use. Additionally, components of the laser system might not have the optimum or the required size or field of view, which may be corrected using an additional optical system within the laser cavity. In order to overcome such effects, and to improve the performance of the overall laser system, it may be necessary or advantageous to add other optical components in the beam's path within the cavity, which operate so as to compensate for the undesired effect or effects. Using prior art distributed laser resonators having a double beam geometry, the insertion of additional optical components into the beam was ineffective because of this double beam geometry. However, this aim now becomes possible by the use of a single beam co-linear resonator, as described in the exemplary cavity structures of the present disclosure, instead of a two beam ring resonator.

Amongst the additional intra-cavity optical components or sub-systems which can be used, and the objectives which their use can achieve, are the following:

(a) A telescope may be used to increase the angular field of view of either the transmitter or the receiver units.

(b) A telescope may be used to increase/decrease the Rayleigh length of the system, thus increasing operation range (for the case of increase of the Rayleigh length) or allowing selection of a single device from several that may be within range (for the case of decrease of the Rayleigh length).

(c) A focusing system in either the transmitter unit or the receiver unit may be used to move the beam waist from the transmitter towards, or even right up to the receiver, thus reducing the size of the beam of at the receiver and hence the receiver's dimensions.

(d) A lens, a grin lens, or a curved mirror system may be used to compensate for thermal lensing, or for compensating for other undesirable lensing effects in the system, such as when a ball mirror retro-reflector is used.

(e) A polarizer may be used to define the polarization of the light propagating within the lasing system.

(f) A waveplate may be used to:
  (i) Define the polarization of the system
  (ii) Prevent unintentional lasing through transparent surfaces inserted into the beam and accidentally inclined at, or close to, the Brewster angle
  (iii) Prevent use of improvised and unauthorized receivers
  (iv) Increase the sensitivity of a safety system (g) Optical elements may be used to correct aberrations caused by various component parts in the system.

(h) The intra-cavity optical system may be used to enable a smaller gain medium to be used to amplify the light both in the forward direction and the backwards direction, allowing for increased gain and reduced size.

Further details of some of these components or sub-systems are given in the Detailed Description section herein below.

The existence of co-linear counter propagating beams has enabled the positioning of such optical components or subsystems within the laser cavity, enabling the achievement of the purposes described in the above paragraphs. This is a significant departure from prior art lasers, whether localized or distributed, where imaging or focusing functions are not generally incorporated within the laser cavity. The generation of focal points within a laser cavity is usually undesirable, since it can lead to hotspots on the coatings of optical components or on the components themselves or to plasma generation within the cavity. Usually there is no need for any components within the laser cavity, other than those essential for the lasing process itself, and attempts are generally made to avoid the inclusion of such additional components within the cavity in order to minimize optical losses, to simplify the system and to eliminate ghost beams. However in a distributed laser cavity for the type of application described in this disclosure, there is need for wide angle angular operation of the end mirrors of the cavity and the gain medium, since the transmitter and receiver units may be disposed at any position within the environmental range of the distributed laser cavity, and the laser must continue to function at its desired efficiency over a wide range of angles of incidence of the input and output beam of each end mirror. This requires an intra-cavity optical sub-system for handling the rays from different angles of incidence in such a manner that they do not detract from the lasing process.

In order to facilitate these aims, the exemplary distributed laser cavities described in the present disclosure advantageously utilize novel designs which involve the use of pupil imaging. Such a pupil imaging system can be defined as one in which light arriving from any incident angle and passing through the pupil, forms an image on a predefined image plane, the image position on this plane being dependent on the angle of incidence of the light passing through the pupil.

All of the light from each different angle of incidence, even if spatially spread out but arriving from a particular angle of incidence, will be transferred to the same spatial point on the image plane, on condition that all of the light from that angle passes through the pupil region. Light from different angles of incidence generates different spatial points on the image plane. The pupil itself can thus be defined based on these properties of the pupil imaging system. A graphic description of this concept is given in FIG. 3 in the Detailed Description section herein below.

Exemplary distributed cavity laser systems described in the present disclosure may be constructed having pupil imaging characteristics, thereby providing the following advantages to the system. Since the positioning of optical components or subsystems within the laser cavity is also an important criterion for ensuring a compact and readily designed lasing system, the optical imaging subsystem is also designed to allow placement of the various components in their optimal positions. There are several different criteria involved, depending on the purpose desired. In the first place, the system should be designed to have regions such that for components placed in that region, light from any angle of incidence is guaranteed to pass through the center of those components. This enables the reduction in the size of those components, thus decreasing cost and increasing efficiency. This can be achieved at the pupil or pupils of a pupil-equipped imaging system, and such a location or locations are therefore suitable for the positioning of such components as the gain medium of the lasing system, the photovoltaic power converting detectors, monitoring diodes, etc.

In practice, a pupil imaging system is defined by using a focusing element such as a lens, disposed at its focal distance from the desired position of the pupil. The above definition of the operation of a pupil based imaging system can be readily described in terms of the Fourier transform between angular and spatial information generated by passage of the beam through the lens. Using Fourier transform methodology a lens is described by the mathematical Fourier transform of angles into positions while the light travels the focal distance. In a simple single lens system, light emitted from the focal point of a lens at an angle to the axis, after passage through the lens, would be directed parallel to the optical axis of the lens at a distance from the axis that is dependent on the angle, thus loosing all angular information and exchanging it completely for spatial information. Reversing the direction of light, spatial information would be retranslated to angular information, so that at the pupil of the system, the beam would have no spatial information (as the pupil point is predefined) and only angular information.

When the lasing system is in operation, a laser beam would be formed between the center of the front pupil of the transmitter and the center of the front pupil of the receiver. When entering (or exiting) the transmitter, that beam would have only angular information, as it is passing through a known point. The optical system in the transmitter now images that front pupil onto an internal pupil plane where the gain medium may optimally be located. The beam passes through the center of the gain medium as that position provides an exact image of the front pupil of the system. Further along the beam's path, a lens positioned at its focal length from the internal pupil, transforms the angular information into spatial information. As soon as there is no angular information, a telecentric region is formed where components sensitive to angular information may be positioned.

In general, throughout this application, the functional effect of a pupil is understood to be achieved either by a real pupil, as implemented by the actual physical position in space through which the beam passes as it enters a lens, or by an image of a real pupil, as projected by imaging to another location in the system. References to a pupil, and claims reciting a pupil, are intended to cover both of these situations.

Applying the definition of a pupil imaging system from above to the distributed laser structures of the present disclosure, one immediate advantage is that when using a gain medium in the form of a thin disk located at the imaging plane of a pupil imaging system, light passing through the pupil from any direction will, after passage through the telescope system, always be centered on the disk of the gain medium at the secondary pupil relative to the output of the telescope. Therefore, a gain medium in the form of a thin disc, having its thickness substantially smaller than its lateral dimensions, will efficiently lase independently of the direction of incidence of the beam directed into the transmitter through the entrance pupil. Such use of a pupil imaging distributed laser system can optimally be implemented if the retroreflectors used in the system do not have a point of inversion, such that the incident beam is reflected back co-linearly from the retroreflector. This location of the gain medium relative to the elements of the pupil imaging system applies whether the imaging system is the input lens of the transmitter containing the gain medium, or the imaging system of the retro-reflector in front of which the gain medium is located. In either of these situations, the gain medium is located relative to the imaging elements such that light from any incident direction within the field of view will be focused onto the gain medium. Examples are given in the detailed description section of this disclosure as to how this is achieved in practice.

In addition, the system may be designed to have other regions, other than at pupil positions, at which beams coming from different angles will be optically directed to traverse those regions parallel to each other (i.e. telecentric regions), enabling the placement of optical components which should operate independently of the angle of incidence of the beam on the input lens.

Furthermore, the system should be designed to have regions where an image of the field of view of the system may be formed (imaging planes). Those regions are especially useful in placing such optical subsystems, for instance for generating an image of the position of the receivers.

Furthermore, the system should be designed to have regions where laser beam does not pass, so that components affected by the laser beam may be placed there. Such components might be detectors such as for monitoring the levels of such parameters as gain medium fluorescence level, thermal lens sensors, pump beam sensors for monitoring the level of the pump diode beams, either directly or through their effect in generating other wavelengths in the gain medium, and safety sensors.

One exemplary implementation of the systems described in this disclosure involves a distributed resonator laser system, comprising:
(i) first and second retro-reflectors, both of the retro-reflectors being such that a beam incident thereon is reflected back along a path essentially coincident with that of the incident beam,
(ii) a gain medium disposed between the first and second retro-reflectors,
(iii) an output coupler, disposed such that part of the beam impinging thereon is directed out of the resonator,
(iv) a beam absorbing component disposed relative to the output coupler, such that that part of the beam directed out of the resonator impinges on the beam absorbing component, and
(v) at least one optical component having at least one non-flat optical surface, disposed between the retro-reflectors, wherein the gain medium is essentially located at a pupil of the optical system incorporating the at least one optical component having at least one non-flat optical surface.

In the above described distributed resonator laser system, the beam absorbing component may be either a photovoltaic power converter or a heat transfer component. Additionally, the at least one optical component may be at least one lens disposed so as to define an entrance/exit pupil, such that light passing through the pupil at a plurality of different angles will be directed to the gain medium. Alternatively, the at least one optical component may be a mirror disposed so as to define an entrance/exit pupil such that light passing through the pupil at a plurality of different angles will be directed to the gain medium.

According to further exemplary implementations, such a system may further comprise a second lens disposed so that the beam is refracted thereby to generate a region of propagation parallel to the axis joining the center of the lens and the gain medium.

Additionally, the at least one optical component having at least one non-flat optical surface may be part of an optical system having an imaging plane. The gain medium may then be located at an imaged pupil of the entrance/exit pupil.

In any of the above described exemplary distributed resonator laser systems, at least one of the first and second retroreflectors should not have a point of inversion. Furthermore, the resonator should then support collinear beam modes. Furthermore, the optical system should have at least one imaging plane, and may have at least one telecentric region.

Additionally, the distributed resonator laser system may further comprise a sensor located at the pupil. The output coupler may be part of one of the retroreflectors, or it may be independent of the retroreflectors.

Additionally, alternative implementations of the distributed resonator laser systems described in this disclosure may comprise:
(i) a first retroreflector reflecting a beam incident thereon back along a path essentially coincident with that of the incident beam,
(ii) a second retroreflector reflecting a beam incident thereon back along a path essentially coincident with that of the beam incident thereon,
(iii) a gain medium disposed between the first and second retroreflectors, and
(iv) a lens system disposed between the first and second retroreflectors, at a position such that the gain medium is situated at an imaging plane of the lens system.

In such a system, the lens system may further have an external pupil plane disposed at its end opposite to that of the gain medium, such that light passing through the external pupil from any direction will be directed towards the center of the gain medium at the internal pupil plane. In any of these systems, the system may include at least one telecentric region. Additionally, it may have at least one imaging plane. In such a case, it may then further comprise an optical sensor forming an electronic picture of the imaging plane. Additional components that may be incorporated into the system include a polarization manipulating optical component, doubling optics, and one or more waveplates located in the telecentric region. The system may further comprise a sensor located in the pupil.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The presently claimed invention will be understood and appreciated more fully from the following detailed description, taken in conjunction with the drawings in which:

DETAILED DESCRIPTION

Figure 3:
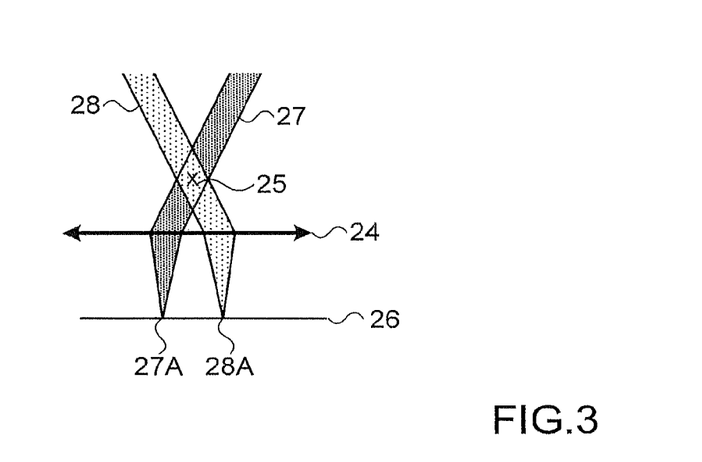
FIG. 3 illustrates the manner in which pupils, or pupil planes and pupil imaging can be visualized, as used in the present disclosure.

Reference is first made to FIG. 3, which is provided to illustrate one way in which pupils, or pupil planes and pupil imaging can be visualized, in order to clarify graphically the explanations thereof given in the Summary section of this disclosure. In FIG. 3, a lens 24 is positioned in space. All collimated beams passing through the pupil 25 form an image spot on the image plane 26. For example collimated beam 27 will be focused on point 27a on the imaging plane, while collimated beam 28 will form a focused image spot 28a on imaging plane 26.

If the system would be designed or set up to handle uncollimated beams with a certain radius of curvature, the imaging plane would move in space, but would still exist. The imaging plane is not necessarily flat. In this application the area in the vicinity of the pupil having a width essentially similar or slightly larger than the beam width, is termed "the pupil", and the plane at which the beams are focused the "imaging plane".

A telescope generally has an entrance pupil and an exit pupil, such that light beams passing through the entrance pupil would also pass through the exit pupil. The two pupils are positioned in space such that one pupil is an optical image of the other.

Figure 4A:
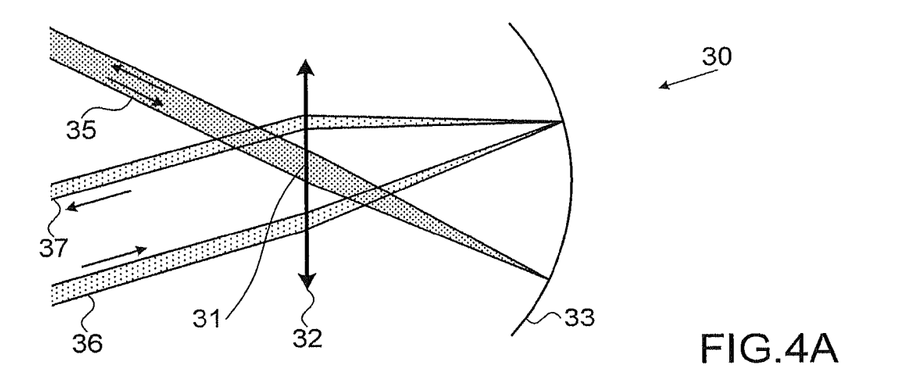
FIG. 4A illustrates schematically a cat's eye retroreflector which can retroreflect a beam traversing its point of inversion.

Reference is now made to FIG. 4A, which illustrates schematically a conventional cat's eye retroreflector configuration 30 which can retroreflect a beam back along its incident path, on condition that it passes through the point of inversion 31, which in FIG. 4A is situated at the center of the lens 32. In such a retroreflector, a concave mirror 33 is disposed at the focal plane of the entrance lens 32, or more accurately, at the focal distance from the entrance lens, such that a beam incident at any angle of incidence is focused by the entrance lens onto the concave mirror surface, each angle of incidence being focused at a different spatial position on the mirror. To illustrate the importance of the point of inversion, two incident beams are shown in FIG. 4A. The beam 35 coming from the top left-hand region of the drawing, passes through the point of inversion 31 at the center of the lens, impinges on the reflector mirror 33 at a normal angle of incidence, and is reflected back along its own incident path. On the other hand, the beam 36 coming from the bottom left hand side of the drawing, passing through the lens at a location away from the point of inversion, impinges on the mirror 33 at an angle of incidence other than zero, and is reflected back on a path 37 which is parallel to, but not coincident with, the incident path. Since rays of light from any incident angle, passing through the point of inversion at the center of the lens, are retroreflected back along their own path, this position represents the pupil of the optical system of the cat's-eye, and this point would be the ideal position for locating the gain medium of the laser cavity. However, the use of this simple cat's eye retroreflector is limited since the pupil is situated at the center of the lens, and it is thus difficult to locate the gain medium there, unless the gain medium also acts as a lens, such as by shaping it as a lens or by using the thermal lensing properties generated by the gain medium during lasing.

Figure 4B:
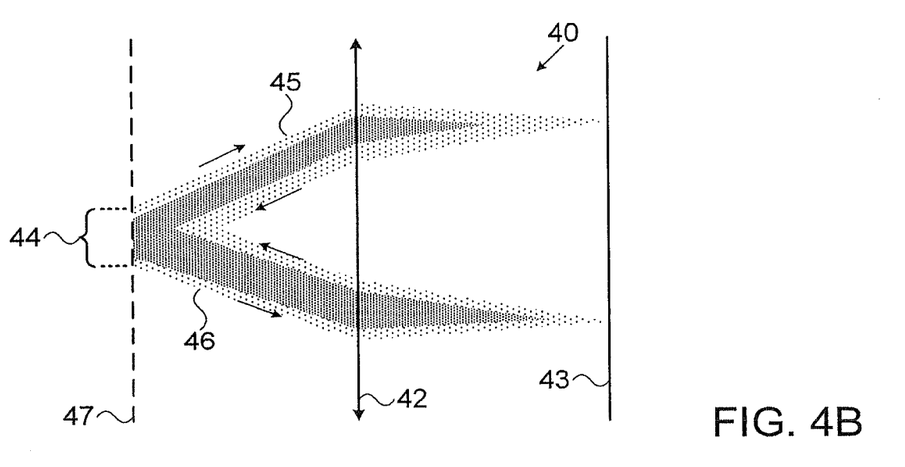
FIG. 4B illustrates schematically a telecentric retroreflector using a flat reflector mirror.

Reference is therefore made to FIG. 4B which illustrates schematically a telecentric retroreflector 40 which overcomes the problem of the inaccessibility of the pupil in the retroreflector of FIG. 4A. The reflection mirror in this case is a flat mirror 43, and as in FIG. 4A, it is located at the focal distance from the lens 42. A pupil, as marked pupil region 44 in FIG. 4, can now be defined at a distance equal to the focal length on the input side of the lens, such that any incident ray passing through the center of the pupil will be focused normally at a position on the reflector mirror in accordance with its angle of incidence, and will be reflected back along its incident path through the center of the pupil. Two such rays 45, 46, coming from different angles of incidence are shown in FIG. 4B. However, unlike the device shown in FIG. 4A, the pupil plane 47 is now physically situated outside of the focusing lens, such that optical components, such as the gain medium, or the photovoltaic converter (assuming it would be only partially absorbing), an iris to block ghost beams or an output coupler, can be positioned at such a pupil without any physical limitation.

Figure 5:
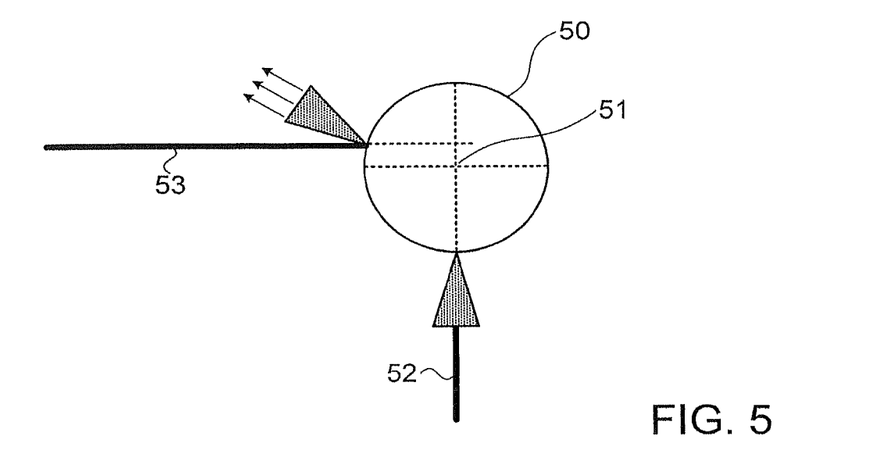
FIG. 5 illustrates schematically a mirror ball retroreflecting a beam directed towards the center of the ball.

An alternative to the above types of cat's eye retroreflectors, are retroreflectors having no point of inversion, but still capable of retroreflecting a beam onto itself. One such example is a mirror ball 50, as shown schematically in FIG. 5. A mirror ball would retroreflect and defocus a beam directed towards the center of the ball 51, as shown by the beam 52 entering the ball mirror vertically, while beams not directed towards the center of the ball mirror, as shown by the beam 53 entering the ball horizontally, are not retroreflected but are reflected off the ball in some other direction and defocused in the procedure.

Figure 6:
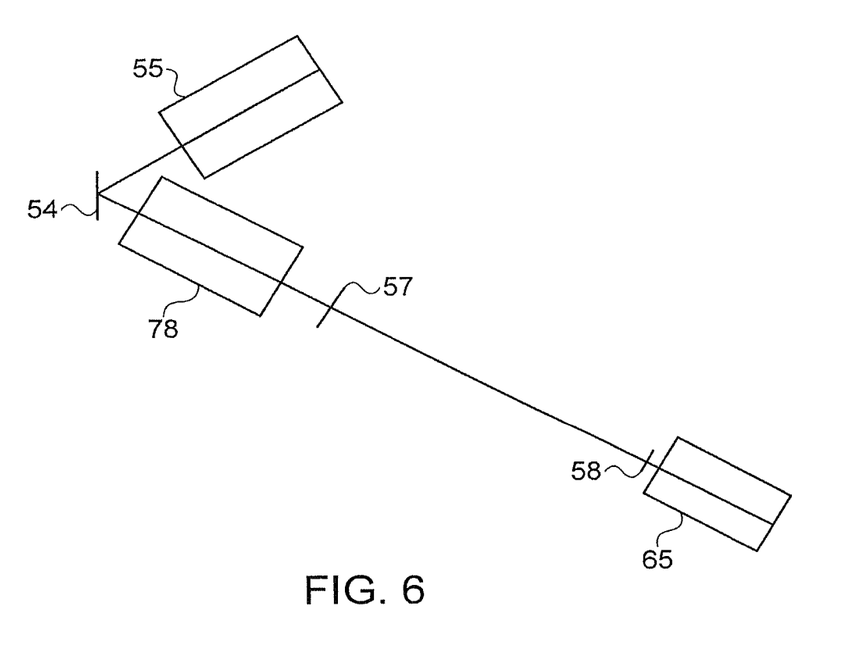
FIG. 6 illustrates schematically a distributed laser system according to one exemplary implementation of the novel structural features described in this disclosure, showing the location of the pupils of the system.
Figure 12:
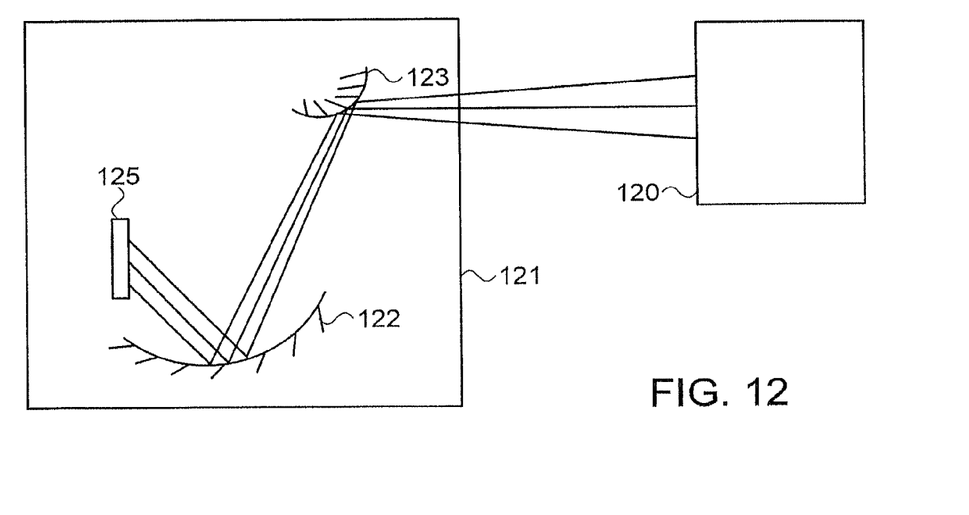
FIG. 12 illustrates schematically the use of mirror focusing in the transmitter, in place of the previously described lens focusing.

Reference now is being made FIG. 6, which illustrates schematically a distributed laser system according to one exemplary implementation of the novel structural features described in this disclosure, such as could be used for distributing optical power from a transmitting power source to remote receivers, which can use the lasing power to operate a portable electronic device or to charge its battery. One characteristic feature of the optical design of such distributed laser systems is the positioning of pupils within the system at locations which enable advantageous positioning of components or elements of the lasing system which should have small lateral dimensions. Thus for instance, the gain medium is placed at pupil 54, which is a common pupil for the internal retro-reflector 55 and for the internal end of the telescope 78, to which it behaves as the internal pupil. The telescope also has an external pupil at its outer side, which is the exit entrance pupil 57 of the transmitter and is coincident with the plane of the optical image of the internal pupil 54, where the gain medium is located. From the exit/entrance transmitter pupil 57 the lasing light propagates essentially collimated towards the center of the receiver entrance/exit pupil 58 and is reflected from the receiver 59 back through this pupil. Since the light between the two entrance/exit pupils (57 and 58) is essentially collimated, the two pupils 57 and 58 are essentially optical equivalents of each other. The receiver and transmitter may have other internal pupils (by means of imaging of the above pupils) where optical components may be placed. In that respect, each of the system's pupils are essentially located at image planes of other system pupils. The telescope shown in the embodiment of FIG. 6 typically uses lenses in its optical system, but it is to be understood that any other optical system which has pupils at the desired locations in the resonator, such that components such as the gain medium can be positioned thereat, can also be used. An exemplary system using mirrors is shown in FIG. 12 herein below.

Figure 7:
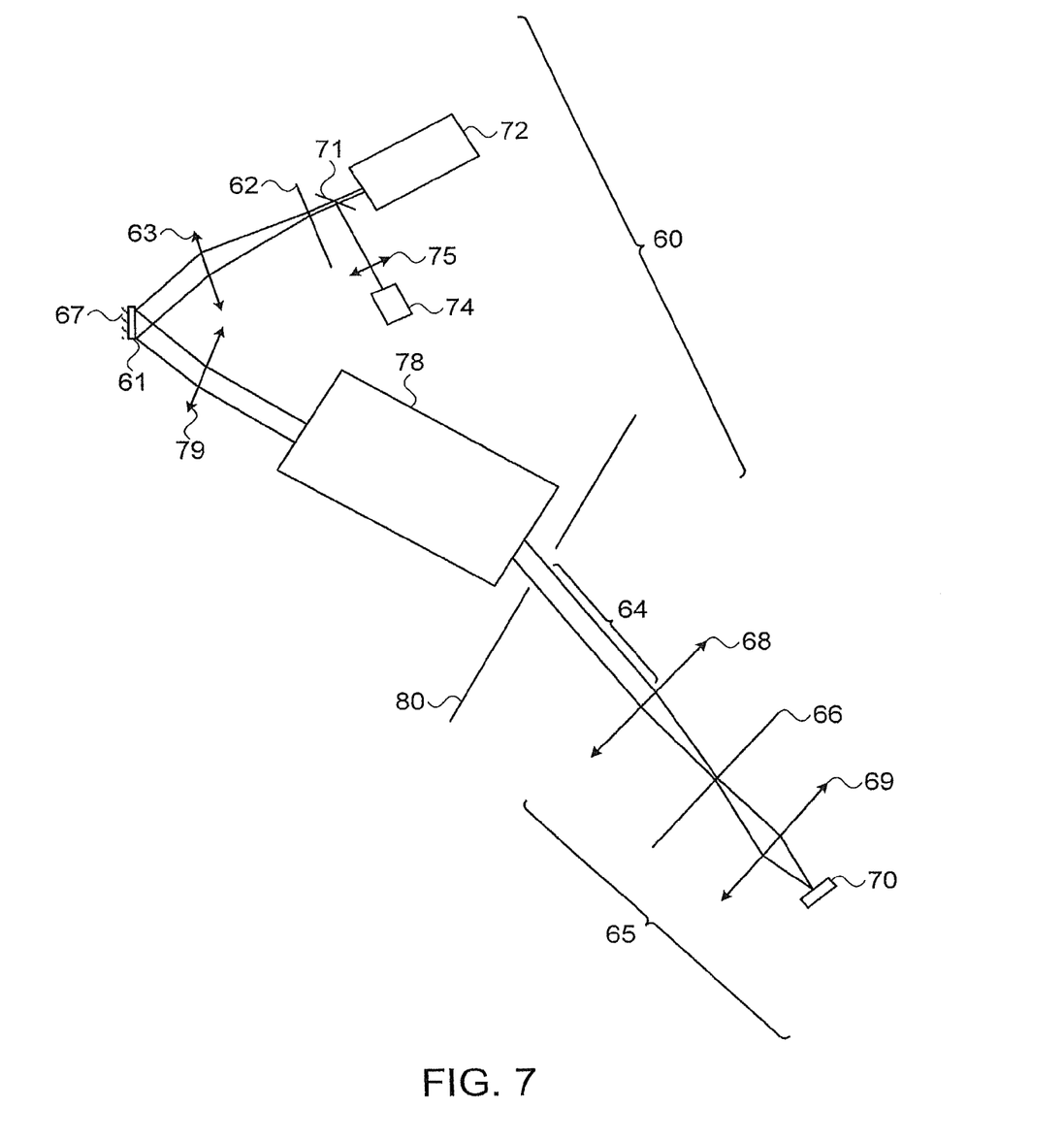
FIG. 7 illustrates schematically the distributed laser system of FIG. 6, including further details of the components therein, and showing additional components of the lasing system.

Reference is now made to FIG. 7, which illustrates schematically a rendering of the distributed laser system shown schematically in FIG. 6, but showing more of the details of the specific elements of the laser. The transmitter 60, situated in the top half of the drawing, containing the gain medium 61 of the laser and the lens 63 and rear mirror 62, form together a telecentric cat's eye retroreflector capable of retroreflecting the lasing beam back onto itself, such as any of the types described hereinabove. The gain medium may advantageously be Nd:YAG, lasing at 1064 nm. The receiver 65 is situated in the bottom part of the drawing, and contains the output coupler 66 which should also be part of a retroreflector reflecting the laser beam back onto itself. These three components, namely the back retroreflector (composed of the lens 63 and the back mirror 62), the gain medium 61, and the output coupler retroreflector (composed of the output coupler 66 and the lens 68) thus constitute the basic lasing system. Their relative location with respect to additional components used in the system is an important element of the novelty of the presently described system. The "intra cavity" beam propagates between the two cavity mirrors 62, 66 in free space 64, which is the transmission path of the lasing beam feeding optical energy from the transmitter 60 to the receiver 65. As described in relation to FIG. 6, the telescope 78 has two pupils, an internal (relative to the transmitter) pupil of the telescope located at, or very close to the gain medium 61 and an external (exit) pupil located on the other side of the telescope, towards the free space propagation region 64. Besides these pupils external to the telescope itself, there may also be an internal pupil or a telecentric region of the telescope, which may be useful for placing other components.

In the exemplary implementation shown in FIG. 7, the rear mirror 62 of the transmitter comprises a flat reflector located at the focal distance of a lens 63, in the same configuration as that shown in FIG. 4B. The gain medium 61 is positioned at the common pupil of both this retroreflector and the internal pupil of the telescope 78, such that light entering through the telescope would be directed towards the gain medium, and then towards the retroreflector, and back. A mirror 67 at the rear of the gain medium 61 reflects the beam towards the back retroreflector 62, such that the beam passes twice through the gain medium in each pass through the laser. However it is to be understood that the system is not meant to be limited to this configuration, and that the gain medium could also have a pure transmission configuration, without the mirror 67, and with the retroreflector linearly located behind the gain medium 61.

The retroreflector of the receiver 65 of this implementation comprises the output coupler 66, such as a partially reflecting mirror, with a lens 68 located at its focal distance from the output coupler. This combination comprises a cat's eye retroreflector which ensures that that part of the beam which passes through the inversion point at the center of the pupil, which is physically located at the center of the lens 68, is reflected back along its incident path. The nature of the laser cavity is such that, when possible, the central part of the beam passing through the pupil would undergo efficient lasing, while other directed beams would not, such that the central part of the beam develops at the expense of other directed parts of the beam. The center of the lens 68 is a pupil of the receiver, such that the receiver, like the transmitter, operates independently of the angle of incidence of the input beam (as long as that passes through the pupil). That part of the beam which passes through the output coupler is again focused by another lens 69 onto the photovoltaic cell 70 which converts the optical power of the laser beam to electricity. This photovoltaic cell is situated at another pupil, the focal length away from the lens 69, such that it can be a small photodiode. Prior art distributed cavity lasers, without the focusing facility enabled by the present implementation, would require a photovoltaic cell of much larger lateral dimensions.

The above description constitutes one possible combination of building blocks of a system exemplary of the type described in this disclosure. The transmitter may also have a number of other features, beyond this structure, and these are also shown in FIG. 7. The transmitter 60 may further comprise a beam blocking aperture 80 disposed at its entrance/exit pupil 57, blocking most of the ghost beams reflected from the optical surfaces. Elimination of such ghost reflections increases the safety of the system. The receiver 65 may likewise have an entrance pupil 58 with a beam blocker (not shown) for the same purpose. A lens at the entrance to the receiver is required in order to relay the position of the internal pupil to the external beam blocker plane. Achieving such an image of the internal pupil may also be achieved by many optical designs.

The back mirror 62 in the transmitter may be partially reflecting, allowing a back leak beam to pass through for monitoring purposes. A beam splitter 71 allows part of the beam to pass through for monitoring the position of receivers which are lasing in conjunction with the transmitter. This sensing device 72 could be in the form of a simple CCD camera, or a quadrant detector or any similar position sensing device. Use of simple algorithmic position detection routines enables the number of receivers to be counted, and their approximate angular positions to be determined.

Figure 8:
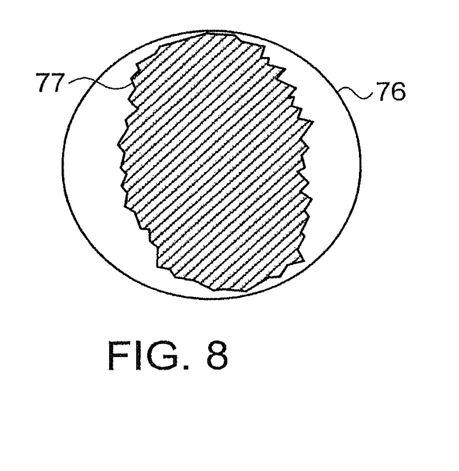
FIG. 8 illustrates the display of a beam profiling unit for determining the presence of any perturbation to the propagating beam shape.

Another part of the back leak beam may optionally be used for inspecting the beam profile, in order to determine the presence of any perturbation to the beam shape. With a cat's eye configuration, the leaked beam is the Fourier transform of the beam's shape at the pupils. In order to inspect the profile of the beam itself, it is necessary to use a lens 75 to image the pupil(s) onto a plane where a beam profiler 74 could be positioned. This is used as a safety feature for determining when an obstruction, such as a part of the user's body, has entered the beam path. Reference is now made to FIG. 8 which illustrates this facility. So long as the beam is unobstructed, the beam profile has a generally circular shape 76, as determined by the beam profiler 74. When even a small obstruction enters the beam from any position, it will cause such a significant degradation in the laser mode that the profile of the output beam will be perturbed by a factor many times larger than the size of the physical perturbation of the obstruction. In the example shown in FIG. 8, a small obstruction has entered the beam at a point horizontal (as defined by the drawing orientation) to the beam, and this has resulted in the generation of a distinctly oval beam profile 77, which can be readily detected by the beam profiler 74. Image processing algorithms can then be used to generate a warning or a shutdown signal to the laser system in order to avoid potential damage to the user who has caused the perturbation by entry into the beam.

The telescope 78 of FIG. 7 may be used to increase the field of view of the transmitter. In addition a polarizer may be placed in a telecentric region in order to define the polarization of the light generated by the laser. The definition of the polarization direction of the lasing beam can be used to prevent lasing through a transparent surface inserted into the beam unintentionally and accidentally aligned at the Brewster angle to the beam. If the laser beam was unpolarized, although the likelihood of a transparent surface being inserted at the Brewster angle is low, it is still an existent danger. However if in addition to the Brewster angle, the transparent surface must be aligned such that the polarization direction of the beam allows the Brewster angle to function as a reflector with the predetermined polarization, the likelihood of this happening is infinitesimally small, thereby increasing the safety of the system. Alternatively a quarter wave plate may be added in the transmitter and or in the receiver at a telemetric region, causing the beam polarization to be circular or unpolarized, therefore eliminating the Brewster angle reflection risk altogether. As an alternative implementation, the polarization direction can be used for coding specific receivers, each polarization direction connecting the transmitter with a specific receiver.

An additional focusing lens 79 may be included in the transmitter 60, in order to make small compensation changes to the Rayleigh length of the system.

Figure 9:
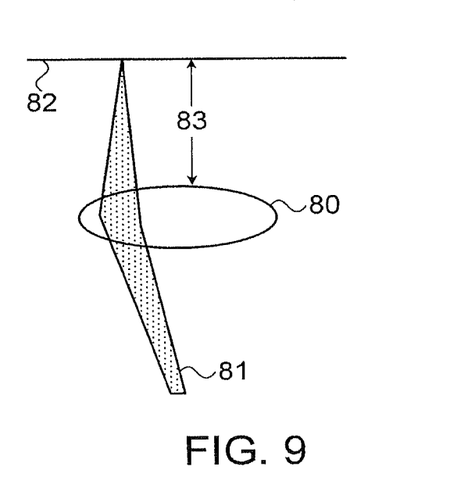
FIG. 9 illustrates how the telecentric region of the system may be generated using an auxiliary lens.

Reference is now made to FIG. 9, which illustrates how the telecentric region of the system may be generated. In a similar manner to the planar mirror cat's eye retroreflector illustrated in FIG. 4B, if a lens 80 is located at its focal distance from a pupil 81 of the system, it will refract the beam in a direction parallel to the axis in its passage towards the imaging plane 82. The imaging plane 82 could be the planar rear mirror of the distributed laser cavity, or any other plane. The region where the beam propagates parallel to the axis is the telecentric region, where it is possible to locate any optical components whose performance is dependent on the direction of the light traversing it. Beams coming through the pupil location at different angles will be refracted in paths laterally displaced from that shown in FIG. 9, but parallel thereto, such that the direction sensitive component will optically handle all of those beams in the same way. Although the configuration of FIG. 9 shows the telecentric region as being parallel to the optical axis of the system, if the pupil is offset from that optical axis, the beams in the telecentric region will at an angle to the optical axis, but will still be parallel to each other, such that they will be optically handled in an identical manner by any directionally sensitive optical component. Such components could include frequency multipliers using optically active crystals, polarizers, any type of wave plate, interference filters, or even additional lasing components associated with a separate laser system.

Figure 10:
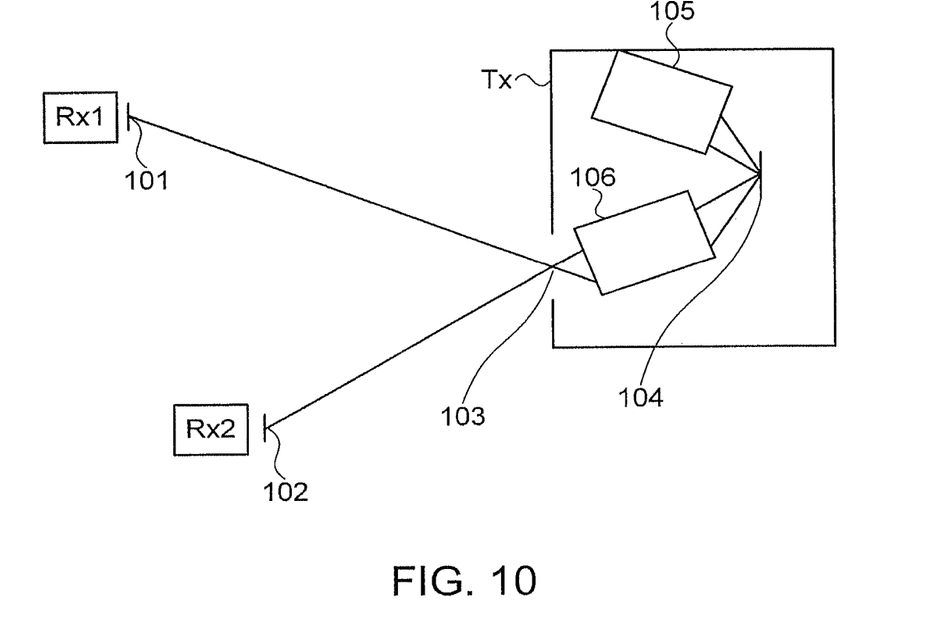
FIG. 10 illustrates schematically the manner in which the pupil imaging systems shown in FIGS. 6 and 7 incorporate a number of pupils.

Reference is now made to FIG. 10 which illustrates schematically the manner in which the pupil imaging systems shown in FIGS. 6 and 7 incorporate a number of pupils, and the functions of each of the pupils. The receivers Rx1 and Rx2 each have an entrance pupil 101, 102, at their front aperture, the function of these pupils being to ensure that incoming beams from any direction are directed into the receiver retro reflector. The iris 103 at the outer aperture of the transmitter Tx is located at an entrance/exit pupil, ensuring that light beams passing through the iris 103 from any external angle are directed into the telescope 106 such that, after traversing the lenses of the telescope, they are focused onto the back pupil of the telescope, where the gain medium 104 is disposed. The same arrangement is of course applicable for light emitted from the gain medium and passing through the telescope out of the transmitter. The pupil location of the gain medium then also acts as a pupil plane for the internal retroreflector 105 of the transmitter Tx. This drawing thus illustrates how the lasing beam passes through a number of sequentially located pupils, defining planes in which externally propagated beams from any angle within the operating field of view of the system are focused into regions of small lateral dimensions, suitable for placement of such components as the gain medium 104, the photovoltaic detector 70, and the input/exit apertures 101, 102, 103 of the receivers or the transmitter respectively.

Figure 11:
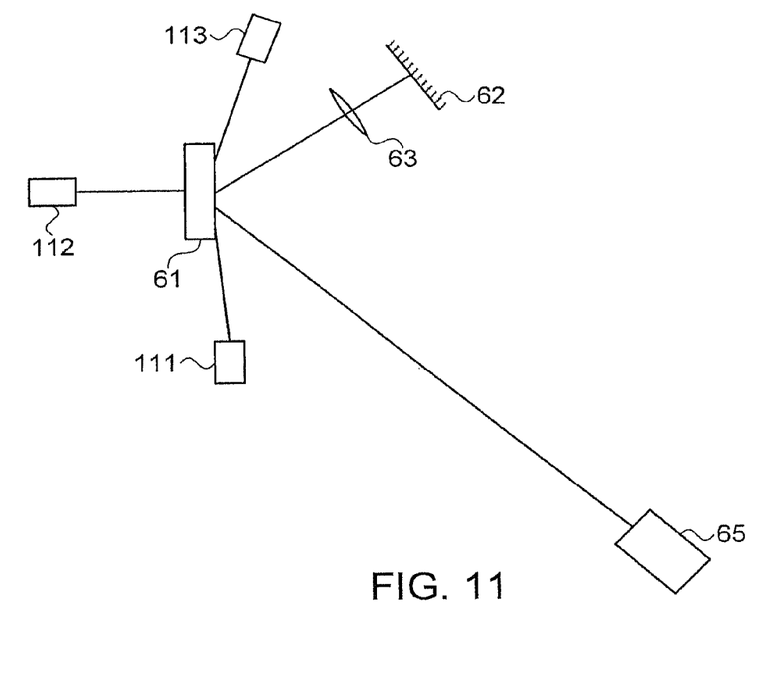
FIG. 11 illustrates schematically the use of regions inaccessible to the beam for various monitoring functions.

Reference is now made to FIG. 11 which illustrates schematically the use of regions inaccessible to the beam for various monitoring functions. One such region has already been shown in FIG. 7 and FIG. 8, where part of the back leak beam from the rear mirror 62 of the cavity is use to monitor the beam shape 76, 77. In addition, there are regions within the transmitter where it is possible to position beam detectors for monitoring functions of the lasing beam, such as photodiodes, even though the detectors themselves are not in the beam path or any selected part of it. The detectors can, for instance, view the gain medium and monitor lasing performance by changes observed therein. Some such locations are shown schematically in FIG. 11, where the various components are labeled as in FIG. 7. Thus, in locations 111, 112 and 113, a sensitive detector can monitor conditions in the gain medium without fear that the beam will impinge upon and damage the detector. Thus for instance, a detector viewing the power level of the fluorescent emission of the gain medium at a wavelength different from the lasing beam would instantly detect any change in beam power arising from the obstruction of part of the external beam path by an object, such as a person's body part, and the monitor signal could be used for momentarily shutting down the laser to avoid damage to the intruding body part. As another exemplary use, the detector could incorporate a filter for viewing a secondary laser emission from the gain medium at a different wavelength, such as may arise when the pump power changes due to pump diode heating, and the monitor signal is used to correct the pump diode temperature or current to restore correct lasing conditions. A thermal lensing sensor may also be used in such locations.

All of the above described implementations of the present systems have been shown using lenses for focusing the laser beam. Reference is now made to FIG. 12 which illustrates schematically a distributed laser system, in which mirrors are used instead of lenses in order to define entrance and exit pupils, such that light passing through the pupil at a plurality of different angles will be directed to the gain medium. In FIG. 12, the beam retro reflected from the receiver 120 to the transmitter 121 is focused by means of a telescope system comprising a pair of mirrors 123, 123, which direct the lasing beam onto the gain medium 125. The gain medium 125 is optimally located at a pupil of the internal end of the double mirror telescope.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A system for distributing optical power from a transmitter to at least one remote receiver, comprising:

an optical system comprising at least one non flat optical component, said optical system having a pupil and generating a telecentric region;

a gain medium, generating a beam of light, located essentially at said pupil of said optical system, such that said beam of light is transmitted through said pupil and said telecentric region;

a photovoltaic power converter disposed in said remote receiver, for converting said beam of light to electricity;

an output coupler, directing part of said light beam impinging thereon towards said photovoltaic power converter;

at least one retroreflector for reflecting said beam of light;

an optical sensor; and a beam splitter allowing parts of said beam of light to be directed towards said optical sensor for monitoring the position of said at least one receiver.

2. A system according to claim 1, wherein said optical system is configured to change the Rayleigh length of said beam of light.

3. A system according to claim 1, wherein said optical system is configured to adapt to the specific distance between said transmitter and said at least one remote receiver.

4. A system according to claim 1, wherein said optical system is configured to adjust the position of the waist of said beam towards or up to the position of a selected one of said at least one remote receiver.

5. A system according to claim 1, further comprising a polarizer or waveplate placed within said telecentric region.

6. A system according to claim 1, further comprising a blocking aperture disposed at a second pupil of said optical system.

7. A system according to claim 6, wherein said optical sensor is any one of a CCD array, a camera, or a quadrant detector.

8. A system according to claim 1, further comprising a detector system for determining when an obstruction has entered the beam path, a monitoring signal obtained from said detector system being adapted to shut down said transmitting power source to avoid damage.

* * * * *